United States Patent [19]

Yoshikawa

[11] Patent Number: 4,745,499
[45] Date of Patent: May 17, 1988

[54] FAST FORWARD AND REVERSE DRIVE MECHANISM RESPONSIVE TO SELECTED TAPE PLAYBACK DIRECTION IN AN AUTO-REVERSE TAPE PLAYER

[75] Inventor: Kikuo Yoshikawa, Tokyo, Japan

[73] Assignee: Clarion Co., Ltd., Tokyo, Japan

[21] Appl. No.: 687,236

[22] Filed: Dec. 28, 1984

[30] Foreign Application Priority Data

Dec. 28, 1983 [JP] Japan .................. 58-247182

[51] Int. Cl.$^4$ ............... G11B 5/008; G11B 15/00; G11B 17/00
[52] U.S. Cl. .................. 360/93; 360/96.3; 360/96.5; 242/199
[58] Field of Search ........... 226/199; 242/197–204; 360/90–96.6

[56] References Cited

U.S. PATENT DOCUMENTS

| 4,408,237 | 8/1983 | Takahashi | 360/96.3 X |
| 4,425,591 | 1/1984 | Ito et al. | 360/96.3 |
| 4,497,001 | 1/1985 | Hayashi | 360/74.2 X |
| 4,538,753 | 9/1985 | Hayashi et al. | 226/199 X |
| 4,581,665 | 4/1986 | Ito et al. | 360/90 |
| 4,587,584 | 5/1986 | Tutino | 360/96.3 X |
| 4,614,987 | 9/1986 | Sukenari et al. | 360/96.3 |

FOREIGN PATENT DOCUMENTS 54-101302  8/1979  Japan ........... 360/96.3

Primary Examiner—John H. Wolff
Assistant Examiner—Alfonso Garcia
Attorney, Agent, or Firm—Flynn, Thiel, Boutell & Tanis

[57] ABSTRACT

A fast forward and reverse drive mechanism is disclosed, which comprises a fast drive link having a fast drive pin disposed at one end and supported rotatably by a pivot shaft at its center portion; a mode plate moving in the left and right directions; a fast forward drive lever and a reverse drive lever superposed on each other and locking the fast drive pin either at the forward side or the reverse side by pushing either one of the levers; two fast drive arms disposed rotatably at both sides of the fast drive link, each having a fast drive shaft at an extremity; guide holes formed at the left and right sides in the mode plate; the fast drive shaft being engaged through these guide holes with the mode plate so that the fast drive shaft moves left and right depending on left and right displacement of the mode plate; and guide holes, each of which consists of a press portion and a slide portion at its left and right sides, formed in the fast forward drive lever and the reverse drive lever, respectively, the guide holes of one of the levers, both at the left and right sides, having press portions at their inner side and slide portions at their outer side, the guide holes of the other having press portions and slide portions respectively at their outer and inner sides; said left and right fast drive shafts being inserted in these guide holes so that the fast drive shaft is located either at the press portions or the slide portions depending on displacement of the fast drive shaft in the left and right directions.

7 Claims, 7 Drawing Sheets

FIG. 3(A)
FIG. 3(B)
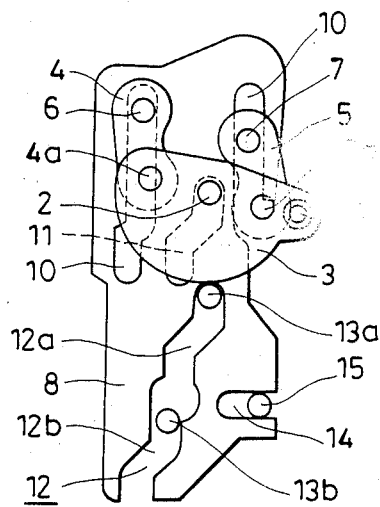
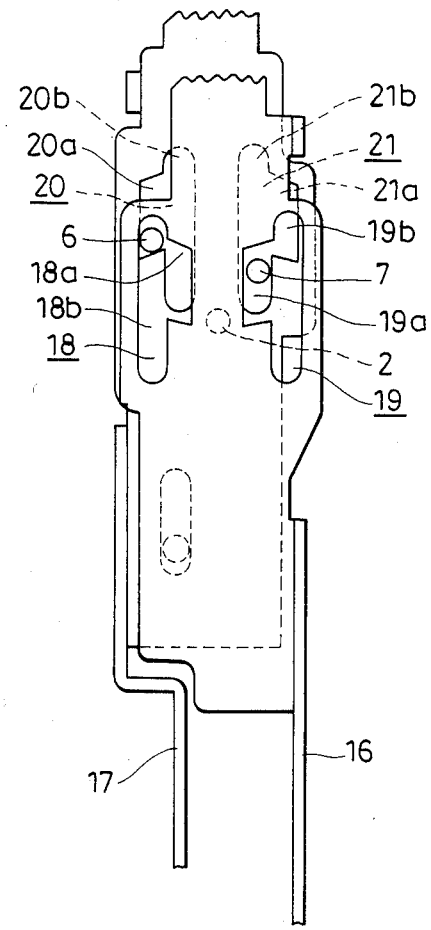

FAST FORWARD AND REVERSE DRIVE MECHANISM RESPONSIVE TO SELECTED TAPE PLAYBACK DIRECTION IN AN AUTO-REVERSE TAPE PLAYER

BACKGROUND OF THE INVENTION

1. Field of the Invention

This invention relates to a fast forward and reverse drive mechanism, and more specifically to a mechanism, in which fast forward and reverse drives are effected by pushing a fast forward drive lever and a reverse lever, respectively, and all the processes from detection of the driving direction to judgement of the direction of and carrying out of a fast drive are effected mechanically.

2. Description of the Prior Art

Among recent tape players, many are provided with a roller change plate capable of parallel translation, where tape drive can be effected in two directions, forward and reverse, by locking the roller change plate either at the forward side or at the reverse side, engaging an idler gear for drive with either one of the reel bases, and at the same time pressing a pinch roller of the same side as the reel base against a capstan shaft under control of a cam disposed on the roller change plate.

Such a fast drive (hereinbelow abbreviated to FD) operation as fast forward or reverse drive in a tape player is effected by pushing a fast forward or reverse lever controlling the operation mentioned above and locking it. By this operation of pushing this lever, the head makes a backward movement and the pinch roller pressed against the capstan shaft leaves the shaft. At the same time, by the fact that the FD pin coupled with the idler gear for FD is locked at the forward or reverse side, the idler gear for FD (hereinbelow abbreviated to FD gear) is engaged with the reel base of the same side and the reel base of that side rotates with a high speed, thus the FD operation is effected.

In a tape player, where tape drive can be effected in two directions, forward and reverse, there are known two types of mechanisms to make such a FD operation, depending on the relation between the operation lever controlling it and the FD direction or the drive direction.

That is, in one of them, when a fast forward or reverse lever is pushed, FD is realized in the forward (or reverse) direction, independently of the forward or reverse direction of the tape during the play mode. In this type of mechanism, when the fast drive lever is pushed, if the drive direction is forward, fast forward drive is done and if the drive direction is reverse, rewind is done. Further, when the reverse lever is pushed, the fast drive direction of the tape is inverted.

This type of mechanism is simple, because the fast drive direction of the tape is determined only by which lever is pushed, independently of the drive direction of the play mode. However, on the other hand, it has a drawback that feeling of use is not good. That is, unless the user knows well the drive direction at the play mode, a piece of music can be jumped over or it can become impossible to hear a desired piece of music.

The other type of mechanism is an improved one, where this drawback has been removed. When the fast forward (or reverse) drive lever is pushed, the fast forward (or reverse) drive operation with respect to the drive direction at the play mode is always realized. For this type of mechanism, it is sufficient for the user to consider only the fast forward (or reverse) drive with respect to the piece of music which he is hearing at that time and to push either one of the levers therefor. Consequently feeling of use is good. However, from the view point of the mechanism, it is necessary to detect the drive direction of the tape in the play mode, based on the position of the roller change plate, etc. and eventually to effect the fast drive of the tape in the reverse direction with respect to the drive direction of the play mode, by changing the displacement direction of the FD pin for the FD operation, notwithstanding that the same lever is pushed.

Heretofore, most of such processes from the detection of the drive direction to judgement of the FD direction or carrying out the FD drive have been performed by electronic control using a microcomputer, plunger solenoids, etc. Such electronic control gives rise to a disadvantage that electric current consumed in a tape player is increased and furthermore the electric control system becomes complicated.

SUMMARY OF THE INVENTION

This invention has been done in order to remove these disadvantages described above of the prior art techniques and its object is to provide a fast forward and reverse drive mechanism which implements all the processes from the detection of the drive direction to judgement of the FD direction or carrying out the FD drive only by a mechanical way to make the electronic control unnecessary and thus to achieve simplification of the electric control system.

In order to achieve this object, the fast forward and reverse drive mechanism according to this invention comprises a fast drive link supported rotatably by a pivot shaft; a fast drive pin disposed at one end of the fast drive link; a mode plate disposed movably; a fast forward drive lever and a reverse drive lever superposed on each other; two fast drive arms disposed rotatably at both the sides of the fast drive link, each having a fast drive shaft at an extremity; a first and a second guide hole disposed in said mode plate; and a third and a forth guide hole disposed in said fast forward drive lever and said reverse drive lever, respectively; whereby the fast drive shafts of the two fast drive arms are inserted into the first and third holes and the second and fourth guide holes, respectively, and the fast drive shaft moves depending on displacement of the mode plate.

In an embodiment of this invention the fast forward and reverse drive mechanism described above is constructed as follows.

It is provided with a FD link having a FD pin at one end and a pivot shaft at the center portion and a mode plate coupled with a roller change plate movable to left and right in dependence on displacement of the roller change plate in the forward and reverse directions.

At both the sides of the FD link are disposed rotatably a left and right FD arm, each of which has a FD shaft at one end. These FD shafts are coupled with the mode plate mentioned above and displaced to left and right depending on displacement of the mode plate toward the forward side and the reverse side.

Guide holes, each of which consists of a press portion and a slide portion at its left and right sides, are formed in the fast forward drive lever and the reverse drive lever, respectively. The guide holes of one of the levers, both at the left and right sides, have press portions at their inner side and slide portions at their outer side. The guide holes of the other have just an inverted form.

Into these guides holes are inserted the left and right FD shafts mentioned above. Due to this fact, notwithstanding that the same lever is pushed, the FD shaft pressed by the lever is different, depending on the position of displacement at the forward and the reverse side of the FD shafts, and thus the displacement direction of the FD link and the FD pin coupled therewith varies depending on the drive direction of the tape.

BRIEF DESCRIPTION OF THE DRAWINGS

FIGS. 3A and 3B are plan views of the mechanism corresponding to FIGS. 1A and 1B, respectively, during the reverse drive in the forward drive mode;

DESCRIPTION OF THE PREFERRED EMBODIMENTS

Figure 1:
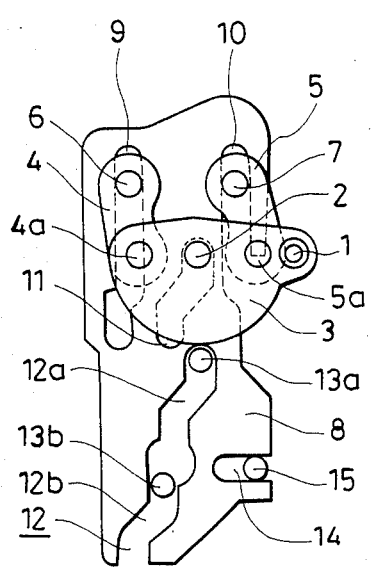
FIG. 1A is a plan view showing the relation between the mode plate and the FD shaft of a fast forward and reverse drive mechanism according to this invention in the forward drive mode.
FIG. 1B is a plan view showing the relation between the operation levers and the FD shaft of the mechanism in the forward drive mode.
Figure 1:
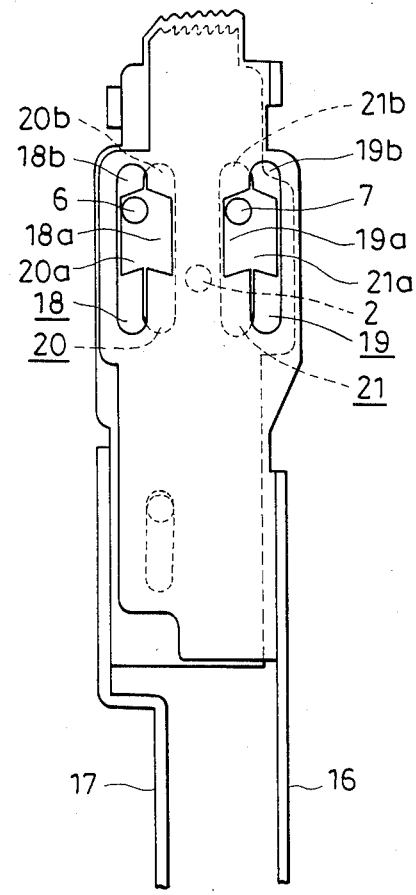

Hereinbelow an example of a fast forward and reverse drive mechanism according to this invention will be explained more in detail, referring to the drawings.

Figure 7:
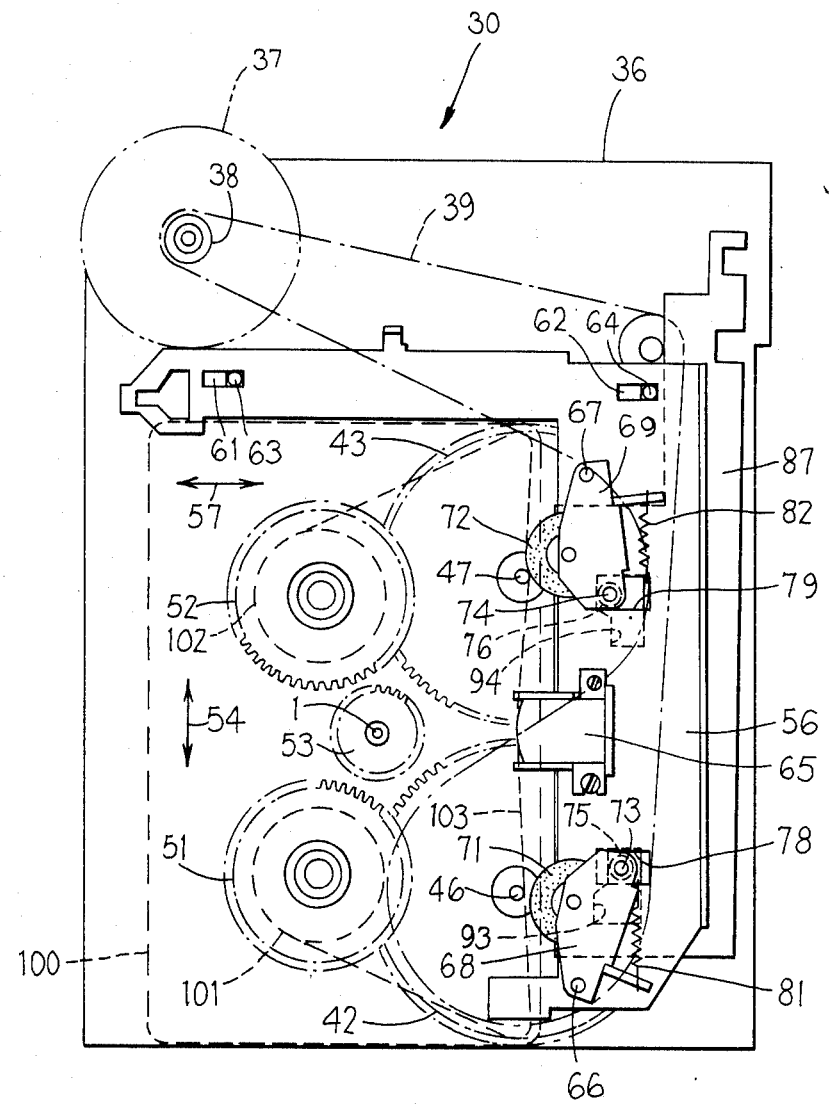
FIG. 7 is a diagrammatic plan view of part of a conventional auto-reverse tape player of the type in which the present invention can be utilized.

Reference is first made to FIG. 7, which discloses a conventional tape player 30 of the type in which the present invention can be utilized. The tape player 30 includes a base plate 36 having a motor 37 mounted thereon, the drive shaft of the motor having thereon a pulley 38 which, through an endless drive belt 39, effects rotation of flywheels 42 and 43. The flywheels 42 and 43 are each rotatably supported on the base plate 36, the flywheel 42 rotating in a clockwise direction and the flywheel 43 rotating in a counterclockwise direction in FIG. 7. The flywheels 42 and 43 are secured to and rotatably drive respective capstans 46 and 47.

Two reel bases 51 and 52 are rotatably supported on the base plate 36 near the flywheels 42 and 43, and can engage respective reels 101 and 102 of a conventional tape cassette 100 removably inserted in the tape player. A first drive gear 53 is rotatably supported between the reel bases on a pin 1. The pin 1 is movable in the directions indicated by arrow 54 from a center position shown in FIG. 7 to an upper position in which teeth on gear 53 ongage teeth on the flywheel 43 and reel base 52 so as to effect high speed counterclockwise rotation of the reel base 52 in response to rotation of the flywheel 43 by the motor 37. The pin 1 can also be moved to a lower position in which the teeth on gear 53 engage teeth on the flywheel 42 and reel base 51 in order to effect high speed clockwise rotation of the reel base 51 in response to rotation of the flywheel 42.

A head plate 56 is supported on the base plate 36 for movement in the directions indicated by arrow 57, the head plate having two slots 61 and 62 which each slidably receive a respective pin 63 or 64 secured on the base plate 36. The leftmost and rightmost positions of the head plate 56 in FIG. 7 are respectively an advanced position and a retracted position thereof. In the advanced position, which is effected during playback or recording, a tape head 65 mounted on the head plate 56 can engage the tape 103 in the conventional tape cassette 100 removably inserted in the tape player. The head plate 56 has two pins 66 and 67 secured thereon which each pivotally support a respective pinch roller support lever 68 and 69. Each of the levers 68 and 69 has a respective rubber pinch roller 71 or 72 rotatably supported thereon, and can pivot between positions in which the pinch roller is respectively engaging and spaced from one of the capstans 46 and 47. Each of the levers 68 and 69 also has thereon a respective pin 73 or 74 which rotatably supports a respective roller 75 or 76, the rollers 75 and 76 respectively extending through approximately rectangular holes 78 and 79 provided in the head plate 56. Pivotal tension springs 81 and 82 each extend between a respective one of the holes 78 and 79 and an arm on a respective one of the levers 68 and 69, so as to urge pivotal movement of each lever in a direction causing the pinch roller thereon to move toward the associated capstan.

A roller change plate 87 is supported on the base plate 30 for movement in the directions indicated by arrow 54. The roller change plate 87 has therein two holes which each have an edge defining a respective cam surface 93 or 94, the rollers 75 and 76 each being engageable with one of the cam surfaces 93 and 94.

In FIG. 7, the head plate 56 is in its advanced position and the roller change plate 87 is in a forward drive mode position in which the cam surface 94 permits the lever 69 to be pivoted by the spring 82 until the pinch roller 72 is engaging the capstan 47 so that, in a conventional manner, the tap 103 is pinched between them and is moved upwardly in a "forward" direction past the tape head 65 during playback. In order to reverse the direction of movement of the tape 103 so that the other side of the tape can be played without physically inverting the tape cassette 100, the change plate 87 can be moved upwardly from the forward drive mode position shown in FIG. 7 to a reverse drive mode position, this movement causing the cam surface 94 to pivot the lever 69 so that the pinch roller 72 moves away from the capstan 47 while the cam surface 93 simultaneously permits the lever 68 to pivot under the urging of the spring 81 so that the pinch roller 71 moves into engagement with the capstan 46, as a result of which the tape 103 in the cassette will be pinched between the pinch roller 71 and capstan 46 and will be moved in a downward or reverse direction past the tape head 65 during playback. When the tape player is not in playback or recording modes, the head plate 56 can be moved rightwardly in FIG. 7 by a conventional and not-illustrated mechanism to its retracted position, the holes 78 and 79 cooperating with the rollers 75 and 76 to ensure that levers 68 and 69 are in positions in which both of the pinch rollers 71 and 72 thereon are spaced from the capstans 46 and 47 and in which the tape head 65 is spaced from the tape.

As mentioned above, the structure illustrated in FIG. 7 and described above is entirely conventional. The subject of the present invention is described below, and relates to an improved mechanism not illustrated in FIG. 7 for effecting movement of the pin 1 and gear 53 in a manner depending in part on the position of the roller change plate 87. The pin 1 shown in FIG. 7 is connected to this mechanism in the manner which is shown in FIG. 1A and described below, and the roller change plate 87 of FIG. 7 has fixedly secured thereto a mode pin 15 which is also shown in FIG. 1A and described below.

As indicated in FIGS. 1A and 1B, a FD link 3 having a FD pin at one end is supported by a pivot shaft 2 at its center portion. At the left and right sides of this FD link 3 are supported 2 FF arms 4, 5 through shafts 4a, 5a. At the extremities of these FD arms 4 and 5 are disposed two FD shafts 6 and 7, respectively, which extend vertically.

Below the FD link 3 is disposed a mode plate 8. At the forward side of this mode plate 8 are formed left and right guide holes 9, 10 extending in the forward and reverse direction, into which the FD shafts 6, 7 described above are inserted. Between the left and right guide holes 9, 10 is formed a first cam hole or slot 11, into which the pivot shaft 2 of the FD link 3 is inserted. This first cam hole 11 consists or a sloped central portion extending from the forward side to the reverse side, from right to left in FIG. 1A, and two engaging portions or parts for the forward and the reverse side, respectively. On the extension line of the cam hole 11 at the reverse side is formed a second cam hole or slot 12, which is longer than the cam hole 11. This second cam hole 12 consists of 2 cam holes 12a and 12b communicating with each other, each of which has the same shape as the first cam hole 11. Into these cam holes 12a, 12b are inserted two pins 13a, 13b disposed on the tape player base plate, which is shown at 36 in FIG. 7.

Further, at the right side of the second cam hole 12 is formed a guide hole 14 extending in the left and right direction, in which is received a mode pin 15 disposed on the roller change plate, which is shown at 87 in FIG. 7. Consequently the mode plate 8 moves in the same direction as the roller change plate through the mode pin 15 and the guide hole 14, depending on the displacement of the plate in the forward and the reverse direction, and at the same time in the left and right direction in FIG. 1 due to the pivot shaft 2, the pins 13a, 13b and the cam holes 11, 12.

Above the FD link 3 are disposed a fast drive lever 16 and a reverse lever 17 superposed on each other. At the same positions at both the sides of each of the levers 16, 17 are formed guide holes 18 to 21, in which the FD shafts 6 and 7 described above are inserted.

The guide holes 18, 19 of the fast drive lever 16 consist of press portions 18a, 19a at the inner side and slide portions 18b, 19b at the outer side. When the FD shafts 6, 7 are at the left side of the guide holes, the left FD shaft 6 slides in the slide portion 18b and the right FD shaft 7 is pressed by the press portion 19a if lever 16 is moved. On the other hand, when the FD shafts 6, 7 are at the right side of the guide holes, contrarily the left FD shaft 6 is pressed if lever 16 is moved.

The guide holes 20, 21 formed in the reverse lever 17, contrarily to those formed in the fast drive lever 16, consist of press portions 20a, 21a at the outer side and slide portions 20b, 21b at the inner side. Consequently, when the FD shafts 6, 7 are at the left side of the guide holes, contrarily to the fast drive lever 16, the left FD shaft 6 is pressed if lever 17 is moved and, on the other hand, when the FD shafts are at the right side of the guide holes, the right FD shaft 7 is pressed if lever 17 is moved.

In addition, the FD pin 1 in this embodiment, as explained in the description of the prior art, is coupled with the FD gear (53 in FIG. 7) and engages the FD gear with the reel base of the forward side or the reverse side (upper side or lower side in the figure) by being locked at the same side.

Further, when the roller change plate (at 87 in FIG. 7) used for this embodiment is locked at the forward side or the reverse side, the pinch roller of the other side is pressed against it. Consequently the roller change plate moves in the direction which is inverse to the direction of the FF pin described above, and the mode pin 15 coupled with the roller change plate moves e.g. toward the reverse side (lower side in the figure) at the forward drive of the tape.

The working mode of this embodiment having the construction described above is as follows.

(1) Forward Drive FIGS. 1A and 1B

In the forward drive mode, since the mode pin 15 is displaced toward the reverse side (lower side in the figure), the mode plate 8 moves to the reverse side through the guide hole 14, too. By this displacement, as indicated in FIG. 1A, the pivot shaft 2 and the pins 13a, 13b guide the cam holes 11, 12 (12a and 12b) and the mode plate 8 is shifted toward the left side by the fact that the pivot shaft 2 and the pins 13a, 13b enter the forward side of the corresponding cam holes.

Since the mode plate is at the left side, the FD shafts 6, 7 inserted into its guide holes 9, 10 are displaced toward the left side, too. This displacement is realized by the fact that the FD arms, 4, 5 provided with the FD shafts 6, 7 at their extremities rotate toward the left side about each of their shafts 4a, 5a. At this time the FD link 3 does not rotate and is at its neutral position. Consequently the FD pin 1 at the end of the FD link 3 is also at its neutral position.

On the other hand, at this time, the upper parts of the FD shafts 6, 7 are, as indicated in FIG. 1B, at the left side of the guide holes 18 to 21 of the fast drive lever 16 and the reverse lever 17, which are at their retreated position.

Figure 2A:
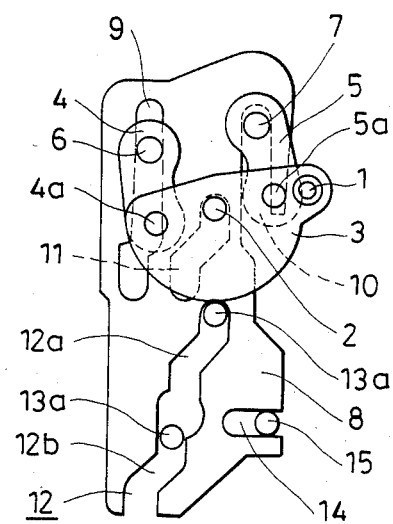
FIGS. 2A and 2B are plan views of the mechanism corresponding to FIGS. 1A and 1B, respectively, during the fast drive in the forward drive mode.
Figure 2B:
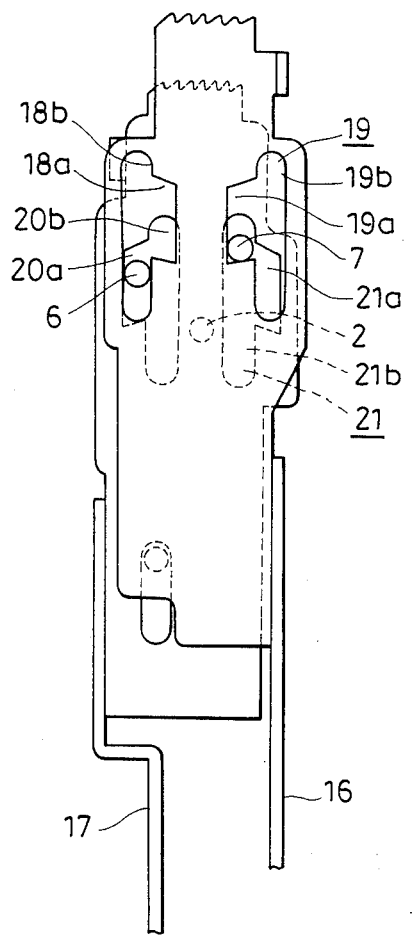

(2) Fast Drive from the Forward Drive Mode FIGS. 2A and 2B

At the forward drive mode, when the fast drive lever 16 is pushed, as indicated in FIG. 2B, since the FD shafts 6, 7 are at the left side, the left FD shaft 6 slides in the slide portion 18b of the left guide hole 18 and the right FD shaft is pressed against the press portion 19a of the right guide hole 19. Consequently only the right FD shaft 7 advances toward the forward side. In this way, since the right FD shaft 7 advances, as indicated in FIG. 2A, in the guide hole 10 toward the forward side, the FD link 3 is rotated counterclockwise by the FD arm 5 and at the same time the left FD shaft 6 makes a backward movement in the guide hole 9 toward the reverse side. By this rotation of the FD link 3 the FD pin 1 disposed at the right extremity moves toward the forward side. As a result the FD gear shown at 53 in FIG. 7 engages with the reel base 52 of the forward side and effects the fast drive in the forward direction, i.e. the fast drive from the forward drive mode is performed.

(3) Reverse Drive from the Forward Drive Mode FIGS. 3A and 3B

In the forward drive mode described in (1), when the reverse lever 17 is pushed, as indicated in FIG. 3B, contrarily to that described for the fast drive in (2), only the left FD shaft 6 advances toward the forward side. In this way, since the left FD shaft 6 advances, as indicated in 3A, in the guide hole 9 toward the forward side, the FD link 3 is rotated clockwise by the FD arm 4 and at the same time the right FD shaft 7 makes a backward movement in the guide hole 10 toward the reverse side. By this rotation of the FD link 3 the FD pin 1 is displaced toward the reverse side. As a result the FD gear engages with the reel base of the reverse side (at 51 in FIG. 7) and thus effects the fast drive in the reverse direction, i.e. the reverse drive from the forward drive mode is performed.

Figure 4:
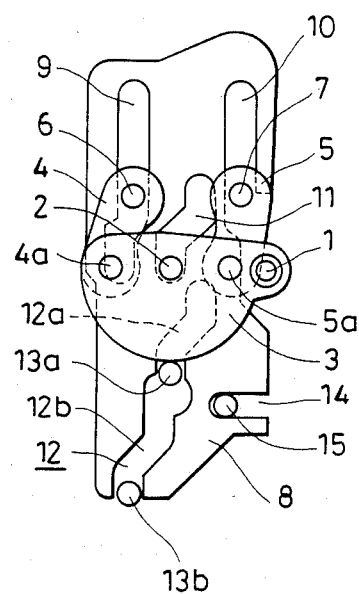
FIGS. 4A and 4B are plan views of the mechanism corresponding to FIGS. 1A and 1B, respectively, during the reverse drive in mode.
Figure 4:
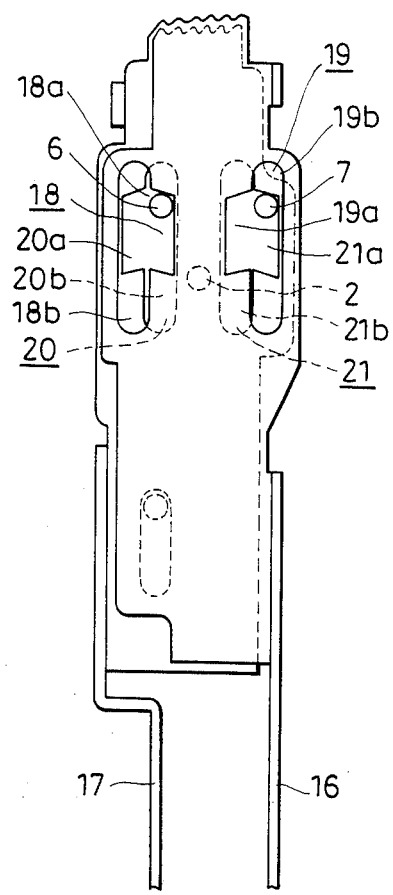

(4) Reverse Drive Mode FIGS. 4A and 4B

In the reverse drive mode, since the mode pin 15 is displaced to the forward side, the mode plate 8 is also displaced to the forward side through the guide hole 14. At this time, as indicated in FIG. 4A, the pivot shaft 2 and the pins 13a, 13b guide by the cam holes 11 and 12 (12a, 12b), respectively, and the mode plate 8 is shifted to the right side by the fact that the pivot shaft 2 and the pins 13a, 13b enter the forward side of the corresponding cam holes.

At the same time, contrarily to the forward drive mode, the FD shafts 6, 7 are displaced to the right side by the guide holes 9, 10 of the mode plate 8 and the FD link 3 and the FD pin 1 are at their neutral positions.

At this time the upper parts of the FD shafts 6, 7 are, as indicated in FIG. 4B, at the right side of the corresponding guide holes 18 to 21 of the levers 16, 17.

Figure 5:
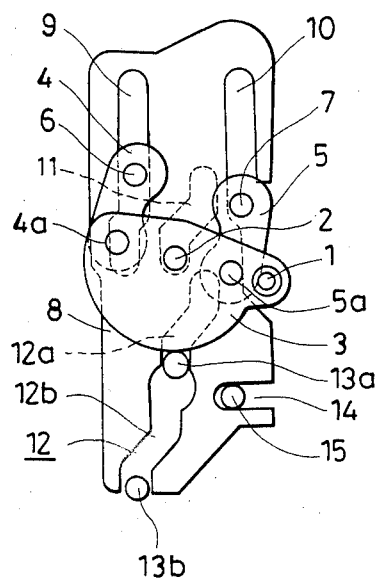
FIGS. 5A and 5B are plan views of the mechanism corresponing to FIGS. 1A and 1B, respectively, during the fast drive in the reverse drive mode.
Figure 5:
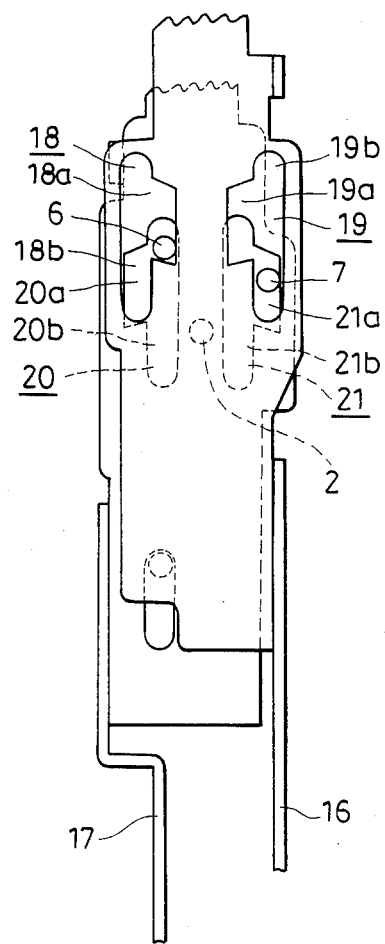

(5) Fast Drive from the Reverse Drive Mode FIGS. 5A and 5B

In the reverse drive mode, when the fast drive lever 16 is pushed, as indicated in FIG. 5B, since the FD shafts 6, 7 are at the right side, contrarily to the forward drive mode, the left FD shaft 6 advances. Consequently, in the same way as for the reverse drive from the forward drive mode, as indicated in FIG. 5A, the FD link rotates clockwise. Thus the FD pin 1 is displaced to the reverse side and the FD gear engages with the reel base of the reverse side. In this way, the fast drive in the reverse direction, i.e. the fast drive from the reverse drive mode, is performed.

Figure 6:
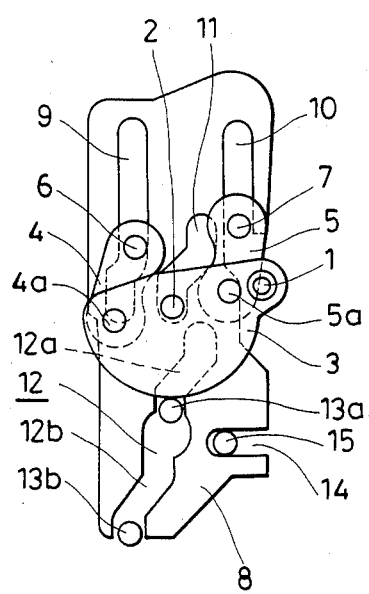
FIGS. 6A and 6B are plan views of the mechanism corresponding to FIGS. 1A and 1B, respectively, during the reverse drive in the reverse drive mode.
Figure 6:
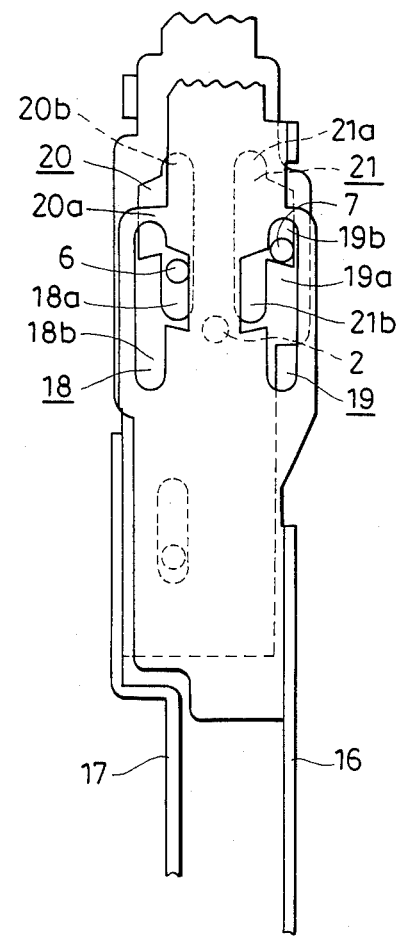

(6) Reverse Drive from the Reverse Drive Mode FIGS. 6A and 6B

In the reverse drive mode, when the reverse lever 17 is pushed, as indicated in FIG. 6B, contrarily to the forward drive mode, the right FD shaft 7 advances. Consequently, in the same way as for the fast drive from the forward drive mode, as indicated in FIG. 6A, the FD link 3 rotates counterclockwise. Thus the FF pin 1 is displaced to the forward side and the FD gear engages with the reel base of the forward side. In this way, the fast drive in the forward direction, i.e. the reverse drive from the reverse drive mode, is performed.

As described above, in the fast forward and reverse drive mechanism according to this invention, when the drive direction of the tape is inverted, the position of the FD shafts in the left and right direction is inverted. In this way, the FD shaft pressed by the fast drive lever or the reverse lever is inverted and at the same time the position, at which the FD pin is locked by the FD link is also inverted. That is, when the fast drive lever (or the reverse drive lever) is pushed in the forward drive mode and when the reverse drive lever (or the fast drive lever) is pushed in the reverse drive mode, the same FD shaft is pressed. Thus the FD pin is locked at the forward side (or at the reverse side) and a FD operation is performed.

In addition, although the roller change plate is so constructed that, when it is locked at the forward side or at the reverse side, the pinch roller of the other side is pressed, this invention is not at all limited to this construction, but a roller change plate so constructed that the pinch roller of the same side is pressed can be also used. In this case, the same effect as described above can be expected either if the shape of the cam holes in the mode plate is inverted or if the mode pin is coupled with the roller change plate in the reverse direction.

As explained above, according to this invention, a fast forward and reverse direction mechanism which implements all the processes from the detection of the drive direction to the judgement of the direction of the fast drive and the execution of the fast drive only by a mechanical mechanism so as to make the electronic control unnecessary can be obtained by a simple construction, where the position of the FD shafts is changed depending on the position of the roller change plate; the FD shaft pressed by the fast drive lever (or the reverse drive lever) is inverted, depending on the position of the FD shafts in the left and right direction; and thus the rotation direction of the FD link is determined by the drive direction of the tape, notwithstanding that the same lever is pushed.

The embodiments of the invention in which an exclusive property or privilege is claimed are defined as follows:

1. In an auto-reverse type tape player having a change member movable between a forward mode position and a reverse mode position, having means cooperable with a tape cassette removably inserted in the tape player for selectively effecting lengthwise tape movement at a first speed in a first direction and in a second direction opposite said first direction when said change member is respectively in said forward mode position and said reverse mode position, and having fast forward and reverse drive means for selectively effecting movement in said first and second directions at a second speed faster than said first speed of a tape in a tape cassette removably inserted in said tape player, the improvement comprising a lever mechanism which controls said fast forward and reverse drive means and which includes:

a fast drive link supported rotatably by a stationary pivot shaft and movable to first and second positions and to a third position between said first and second positions;

a fast drive pin disposed on said first drive link at a location spaced radially from said pivot shaft, said fast forward and reverse drive means being responsive to said fast drive pin for effecting tape movement at said second speed in said first and second directions when said fast drive link is respectively in said first and second positions;

a mode plate supported for movement between forward drive and reverse drive positions and being operatively coupled to said change member for movement synchronously therewith, said mode plate being in said forward and reverse drive positions when said change member is respectively in said forward and reverse mode positions;

a fast forward drive lever and a reverse drive lever disposed adjacent each other and each supported for movement in a direction approximately transverse to the directions of movement of said mode plate;

first and second fast drive arms supported rotatably on said first drive link for movement about respective pivot axes and each having thereon a fast drive shaft at a location spaced from said pivot axis thereof;

a first guide hole and a second guide hole provided in said mode plate; and a third guide hole and a fourth guide hole provided in each of said fast forward drive lever and said reverse drive lever, a first of said fast drive shafts being slidably received in said first guide hole and each of said third guide holes, and a second of said fast drive shafts being slidably received in said second guide hole and each of said fourth guide holes, wherein as said mode plate moves between said forward and reverse drive positions it moves said fast drive shafts in directions approximately transverse to the directions of movement of said fast forward and reverse drive levers, said third and fourth guide holes having means engageable with said first and second fast drive shafts for effecting pivotal movement of said fast drive link from said third position to said first position in response to movement of said fast forward drive lever when said mode plate is in said forward drive position and in response to movement of said reverse drive lever when said mode plate is in said reverse drive position, and for effecting pivotal movement of said fast drive link from said third position to said second position in response to movement of said fast forward drive lever when said mode plate is in said reverse drive position and in response to movement of said reverse drive lever when said mode plate is in said forward drive position.

2. The tape player according to claim 1, wherein said mode plate has therein a cam hole which is located between said first and said second guide holes and which slidably receives said pivot shaft for said fast drive link.

3. The tape player according to claim 1, wherein said means for effecting pivotal movement of said fast drive link includes each said third and fourth guide hole having a press portion and having a slide portion, wherein said first fast drive shaft is respectively disposed in said press portion and said slide portion of said third guide hole in said fast forward drive lever and is respectively disposed in said slide portion and said press portion of said third guide hole in said reverse drive lever when said mode plate is respectively in said forward drive position and said reverse drive position, wherein said second fast drive shaft is respectively disposed in said slide portion and said press portion of said fourth guide hole in said fast forward drive lever and is respectively disposed in said press portion nd said slide portion of said fourth guide hole in said reverse drive lever when said mode plate is respectively in said forward drive position and said reverse drive position, wherein when one of said fast forward and reverse drive levers is moved said press portion of one of said guide holes therein engages and effects movement of the fast drive shaft disposed in such press portion which in turn causes the fast drive arm coupled to such fast drive shaft to move and to pivot said first drive link, and wherein when one of said fast forward and reverse drive levers is moved the fast drive shaft disposed in the slide portion of one of said guide holes therein slides freely along the slide portion throughout the movement of the lever.

4. The tape player according to claim 2, wherein said cam hole has at each end thereof an engaging portion extending approximately parallel to the directions of movement of said change member, and has between said engaging portions a sloped portion which is inclined with respect to said engaging portions.

5. The tape player according to claim 4, wherein said first and second guide holes in said mode plate are elongate slots which extend substantially parallel to the directions of movement of said change member, and wherein said fast forward and reverse drive levers move in directions substantially parallel to the directions of movement of said change member.

6. The tape player according to claim 5, wherein said fast drive arms extend in directions approximately parallel to the directions of movement of said change member, said pivot axes for said fast drive arms being spaced in a direction transverse to the directions of movement of said fast forward and reverse drive levers and being disposed on opposite sides of said pivot shaft.

7. The tape player according to claim 4, wherein said tape player has first and second rotatably supported reel bases engageable with a tape cassette removably inserted in the tape player, and wherein said fast forward and reverse drive means effects said movement of a tape at said second speed by effecting high speed rotation of said first reel base when said fast drive link is in said first position and by effecting high speed rotation of said second reel base when said fast drive link is in said second position.

* * * * *

UNITED STATES PATENT AND TRADEMARK OFFICE
CERTIFICATE OF CORRECTION

PATENT NO. : 4,745,499
DATED : May 17, 1988
INVENTOR(S) : Kikuo YOSHIKAWA

It is certified that error appears in the above-identified patent and that said Letters Patent is hereby corrected as shown below:

Column 9, Line 5; Change "first" to ---fast---.

Column 10, Line 7; Change "portion nd" to ---portion and---.

Column 10, Line 16; Change "first" to ---fast---.

Column 10, Line 41; Change "Claim 4" to ---Claim 1---.

Signed and Sealed this

Twentieth Day of September, 1988

Attest:

DONALD J. QUIGG

*Attesting Officer*  *Commissioner of Patents and Trademarks*